(12) United States Patent
O'Gorman et al.

(10) Patent No.: US 9,818,203 B2
(45) Date of Patent: Nov. 14, 2017

(54) METHODS AND APPARATUSES FOR MONITORING OBJECTS OF INTEREST IN AREA WITH ACTIVITY MAPS

(71) Applicant: Alcatel-Lucent USA Inc., Murray Hill, NJ (US)

(72) Inventors: Lawrence O'Gorman, Madison, NJ (US); Dorel Livescu, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 589 days.

(21) Appl. No.: 14/247,565

(22) Filed: Apr. 8, 2014

(65) Prior Publication Data

US 2015/0287214 A1 Oct. 8, 2015

(51) Int. Cl.
| | |
|---|---|
| *H04N 7/12* | (2006.01) |
| *H04N 11/02* | (2006.01) |
| *H04N 11/04* | (2006.01) |
| *G06T 7/20* | (2017.01) |
| *G06K 9/00* | (2006.01) |
| *G06K 9/46* | (2006.01) |
| *G06T 7/292* | (2017.01) |

(52) U.S. Cl.
CPC ........ *G06T 7/2093* (2013.01); *G06K 9/00771* (2013.01); *G06K 9/4642* (2013.01); *G06T 7/292* (2017.01); *G06T 2207/30232* (2013.01); *G06T 2207/30241* (2013.01)

(58) Field of Classification Search
None
See application file for complete search history.

(56) References Cited

U.S. PATENT DOCUMENTS

| | | | | |
|---|---|---|---|---|
| 8,564,661 | B2 * | 10/2013 | Lipton | G08B 13/19608 348/143 |
| 8,570,376 | B1 * | 10/2013 | Sharma | H04N 7/18 348/159 |
| 2003/0023595 | A1 * | 1/2003 | Carlbom | G06F 17/3079 |

(Continued)

OTHER PUBLICATIONS

Girgensohn, et al., "Determining Activity Patterns in Retail Spaces Through Video Analysis", Proc. 16th ACM Int. Conf. Multimedia, Vancouver, BC, Oct. 2008, pp. 889-892.

(Continued)

*Primary Examiner* — Talha M Nawaz
(74) *Attorney, Agent, or Firm* — Harness, Dickey & Pierce, P.L.C.

(57) ABSTRACT

An apparatus for monitoring movement of objects of interest in an area includes an activity map generation circuit and a unified activity map generation circuit. The activity map generation circuit is configured to: generate a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area; and standardize the plurality of activity maps with regard to a single common point of view. The unified spatial activity map generation circuit is configured to combine the plurality of standardized activity maps into a unified activity map.

18 Claims, 11 Drawing Sheets
(5 of 11 Drawing Sheet(s) Filed in Color)

(56) References Cited

U.S. PATENT DOCUMENTS

| | | | |
|---|---|---|---|
| 2003/0174772 A1* | 9/2003 | Voronov | H04N 5/144 375/240.06 |
| 2008/0198159 A1* | 8/2008 | Liu | G08B 13/19641 345/420 |
| 2012/0010914 A1* | 1/2012 | Magerkurth | G06Q 10/063 705/7.11 |
| 2014/0056519 A1* | 2/2014 | Gupta | G06T 7/0081 382/173 |
| 2014/0247323 A1* | 9/2014 | Griffis | H04N 5/23238 348/36 |

OTHER PUBLICATIONS

Ihaddadene, et al., "Real-Time Crowd Motion Analysis", Proc. 19th Int. Conf. Pattern Recognition, Tampa, FL, Dec. 2008, pp. 1-4.

Allain, et al., "AGORASET: a dataset for crowd video analysis", IAPR Workshop Pattern Recognition and Crowd Analysis, Tskuba, Japan, Nov. 2012.

M. Wirz, et al., "Inferring crowd conditions from pedestrians' location traces for real-time crowd monitoring during city-scale mass gatherings", IEEE 21st Int. Workshop Enabling Technologies: Infrastructure for Collaborative Enterprises, Toulouse, France, Jun. 2012, pp. 367-372.

G. Pingali, et al., "Multimedia retrieval through spatio-temporal activity maps", Proc. 9th ACM Int. Conf. Multimedia, Ottawa, Canada, Sep. 2001, pp. 129-136.

N. Friedman, et al., "Image segmentation in video sequences: A probabilistic approach," Proc. 13th Conference on Uncertainty in Artificial Intelligence, Morgan Kaufmann Publ., 1997, pp. 175-181.

C. Stauffer, et al., "Adaptive background mixture models for real-time tracking," Proc. IEEE Comp. Soc. Conf. on Computer Vision and Pattern Recognition, 1999, pp. 246-252.

B. D. Lucas, et al., "An iterative image registration technique with an application to stereo vision," Int. Conf. Artificial Intell, pp. 674-679, 1981.

J. L. Barron, et al., "Performance of optical flow techniques," Int. J. Computer Vision, vol. 12, No. 1, 1994, pp. 43-77.

P. Smith, et al., "Layered motion segmentation and depth ordering by tracking edges", IEEE Trans. Pattern Analysis and Machine Intelligence, 26(4), Apr. 2004, pp. 479-494.

S. Gruenwedel,"An edge-based approach for robust foreground detection", Advanced Concepts for Intelligent Vision Systems, Belgium, pp. 554-565, Aug. 2011.

B. Ristic, et al., "Beyond the Kalman filter: Particle filters for tracking applications", Artech Print Publ., 2004.

D. Makris, et al., "Bridging the gaps between cameras", IEEE Conf. Computer Vision and Pattern Recognition, Washington, DC, Jun. 2004, vol. 2, pp. 205-210.

C. C. Loy, et al., "Multi-camera activity correlation analysis", IEEE Conf. Computer Vision and Pattern Recognition, Miami, FL, Jun. 2009, pp. 1988-1995.

H. Lee, et al., "Collaborative node localization in surveillance networks using opportunistic target observations", Proc. 4th ACM Int. Workshop Video Surveillance and Sensor Networks, Santa Barbara, CA, Oct. 2006, pp. 9-18.

X. Zou, et al., A. K. Roy-Chowdhury, "Determining topology in a distributed camera network", 14th IEEE Int. Conf. Image Processing, San Antonio, TX, Sep. 2007, V.133-136.

J. Knuth, et al., "Maximum-likelihood localization of a camera network from heterogeneous relative measurements", American Control Conf., Washington, DC, Jun. 2013.

T. J. Ellis, et al., "Learning a multi-camera topology", Joint IEEE Workshop Visual Surveillance and Performance Evaluation of Tracking and Surveillance, Nice, France, Oct. 2003, pp. 165-171.

E. B. Ermis, et al., "Activity based matching in distributed camera networks", IEEE Trans. Image Processing, 19(10), Oct. 2010, pp. 2595-2613.

M. Parzych, et al., "Automatic people density maps generation with use of movement detection analysis", 6th Int. Conf. Human System Interaction, Sopot, Poland, Jun. 2013, pp. 26-31.

N. D. Bird, "Detection of loitering individuals in public transportation areas", IEEE Trans. Intelligent Transportation Systems, 6(2), Jun. 2005, pp. 167-177.

C.H. Huang, M.Y. Shih, Y.T. Wu, J. H. Kao, "Loitering detection using Bayesian appearance tracker and list of visitors", in LNSC 5353, Advances in Multimedia Information Processing—Proceedings of the 9th Pacific Rim Conference on Multimedia, ed.s Y. Huang, K. Cheng, J. Yang, Springer-Verlag Publ. Berlin, Germany, Dec. 2008, pp. 906-910.

L. Kratz, et al., "Anomaly detection in extremely crowded scenes using spatio-temporal motion pattern models", IEEE Conf. Computer Vision and Pattern Rec., pp. 1446-1453, Miami, Florida, Jun. 2009.

L. O'Gorman, et al., "Motion feature filtering for event detection in crowded scenes", Pattern Recognition Letters, 2013.

"BIWI Walking Pedestrians dataset", ETH Zurich, 2009, <http://www.vision.ee.ethz.ch/datasets/>.

* cited by examiner

METHODS AND APPARATUSES FOR MONITORING OBJECTS OF INTEREST IN AREA WITH ACTIVITY MAPS

BACKGROUND

Single camera activity maps have long been used to show the density of objects of interest (e.g., people, vehicles, etc.) moving in an area. As displayed in heat map form, these maps indicate relative activity over time with respect to spatial locations. For building safety, activity maps are used to learn of bottlenecks in building escape routes that delay mass exit. For retail, activity maps are used to examine common paths of shoppers (such as, e.g., which shop windows shoppers pause at, what displays can entice a detour, etc.). For public spaces, activity maps are used to distinguish between areas of congregation and paths of movement.

In addition to density, activity maps provide other activity features that may be useful. For instance, pseudo-color maps have been used to distinguish path directions in active areas. However, density remains the most popular feature.

SUMMARY

For a broad area covered by multiple cameras, multiple ones of single camera activity maps may be combined into a unified, wide-area activity map after transformations and normalizations are made to the single-camera activity features such that all data are viewed from a common perspective.

Example embodiments provide methods and apparatuses for generating a unified activity maps. In so doing, example embodiments provide methods for transforming and/or normalizing activity feature maps such that the activity maps for respective activity features may be combined into, stored and/or displayed to a user. In one example, the unified activity maps for respective activity features may be overlayed on one another for display to a user concurrently and/or simultaneously. Moreover, one or more unified activity maps may be overlayed with trajectory graphs and displayed to a user.

Example embodiments also provide methods and apparatuses for monitoring movement of objects of interest in an area.

At least one example embodiment provides an apparatus for monitoring movement of objects of interest in an area. According to at least this example embodiment, the apparatus includes an activity map generation circuit and a unified spatial activity map generation circuit. The activity map generation circuit is configured to: generate a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area; and standardize the plurality of activity maps with regard to a single common point of view. The unified spatial activity map generation circuit is configured to combine the plurality of standardized activity maps into a unified activity map.

According to at least some example embodiments, the apparatus may further include: a display configured to display the unified activity map to a user. The display may display the unified activity map to the user along with a trajectory graph corresponding to the unified activity map.

The apparatus may further include a memory to store the unified activity map.

The activity map generation circuit is may be configured to: generate a set of motion blur images for each of the plurality of cameras based on the video content; and generate each of the plurality of activity maps based on a corresponding set of motion blur images.

The video content from each of the plurality of cameras may include a sequence of image frames; and the activity map generation circuit may be further configured to: generate each motion blur image in the set of motion blur images based on a motion blur image corresponding to a current image frame in the sequence of image frames and motion blur images corresponding to previous image frames in the sequence of image frames.

The relative activity of the objects of interest over time may be one of density, dwell, direction, bi-direction and velocity of the objects of interest over time.

Each of the plurality of activity maps may include spatial activity feature values for one of density, dwell, direction, bi-direction and velocity.

The activity map generation circuit may be further configured to standardize the plurality of activity maps with regard to the single common point of view by at least one of: modifying a direction feature with respect to tilt of at least one camera among the plurality of cameras; transforming a spatial perspective of at least one of the plurality activity maps from image coordinates to coordinates corresponding to the single common point of view; normalizing an orientation of at least one of the plurality of activity maps; normalizing probabilities with respect to at least one of the plurality of cameras; and transforming a perspective spread of at least one of the plurality of activity maps.

At least one other example embodiment provides an apparatus for monitoring movement of objects of interest in an area. According to at least this example embodiment, the apparatus includes: an activity map generation circuit configured to generate, using a single motion blur method, a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area; and a unified spatial activity map generation circuit configured to combine the plurality of activity maps into a unified activity map.

The unified activity map may include spatial and temporal activity feature values for the objects of interest.

The apparatus may further include: a display configured to display the unified activity map to a user. The display may be configured to display the unified activity map to the user along with a trajectory graph corresponding to the unified activity map.

The apparatus may further include: a memory configured to store the unified activity map.

The activity map generation circuit may be further configured to: generate a set of motion blur images for each of the plurality of cameras based on the video content; and generate each of the plurality of activity maps based on a corresponding set of motion blur images.

According to at least some example embodiments, the video content from each of the plurality of cameras may include a sequence of image frames; and the activity map generation circuit may be configured to: generate each motion blur image in the set of motion blur images based on a motion blur image corresponding to a current image frame in the sequence of image frames and motion blur images corresponding to previous image frames in the sequence of image frames.

The relative activity of the objects of interest over time may be one of density, dwell, direction, bi-direction and velocity of the objects of interest over time. Each of the plurality of activity maps may include spatial activity feature values for one of density, dwell, direction, bi-direction and velocity.

The activity map generation circuit may be further configured to standardize the plurality of activity maps with regard to a single common point of view by at least one of: modifying a direction feature with respect to tilt of at least one camera among the plurality of cameras; transforming a spatial perspective of at least one of the plurality activity maps from image coordinates to coordinates corresponding to the single common point of view; normalizing an orientation of at least one of the plurality of activity maps; normalizing probabilities with respect to at least one of the plurality of cameras; and transforming a perspective spread of at least one of the plurality of activity maps.

At least one other example embodiment provides a method for monitoring movement of objects of interest in an area, the method including: generating a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area; standardizing the plurality of activity maps with regard to a single common point of view; combining the plurality of standardized activity maps into a unified activity map; and at least one of storing and displaying the unified activity map.

At least one other example embodiment provides a method for monitoring movement of objects of interest in an area, the method including: generating, using a single motion blur method, a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area; combining the plurality of activity maps into a unified activity map; and at least one of storing and displaying the unified activity map.

At least one other example embodiment provides a tangible computer-readable medium storing computer-executable instructions that, when executed on a computer device, cause the computer device to execute a method for monitoring movement of objects of interest in an area, the method including: generating a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area; standardizing the plurality of activity maps with regard to a single common point of view; combining the plurality of standardized activity maps into a unified activity map; and at least one of storing and displaying the unified activity map.

At least one other example embodiment provides a tangible computer-readable medium storing computer-executable instructions that, when executed on a computer device, cause the computer device to execute a method for monitoring movement of objects of interest in an area, the method including: generating, using a single motion blur method, a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area; combining the plurality of activity maps into a unified activity map; and at least one of storing and displaying the unified activity map.

At least one other example embodiment provides a computer program and/or computer program product including a computer program that, when executed on a computer device, causes the computer device to execute a method for monitoring movement of objects of interest in an area, the method including: generating a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area; standardizing the plurality of activity maps with regard to a single common point of view; combining the plurality of standardized activity maps into a unified activity map; and at least one of storing and displaying the unified activity map.

At least one other example embodiment provides a computer program and/or computer program product including a computer program that, when executed on a computer device, causes the computer device to execute a method for monitoring movement of objects of interest in an area, the method including: generating, using a single motion blur method, a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area; combining the plurality of activity maps into a unified activity map; and at least one of storing and displaying the unified activity map.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will become more fully understood from the detailed description given herein below and the accompanying drawings, wherein like elements are represented by like reference numerals, which are given by way of illustration only and thus are not limiting of the present invention.

Figure 1:
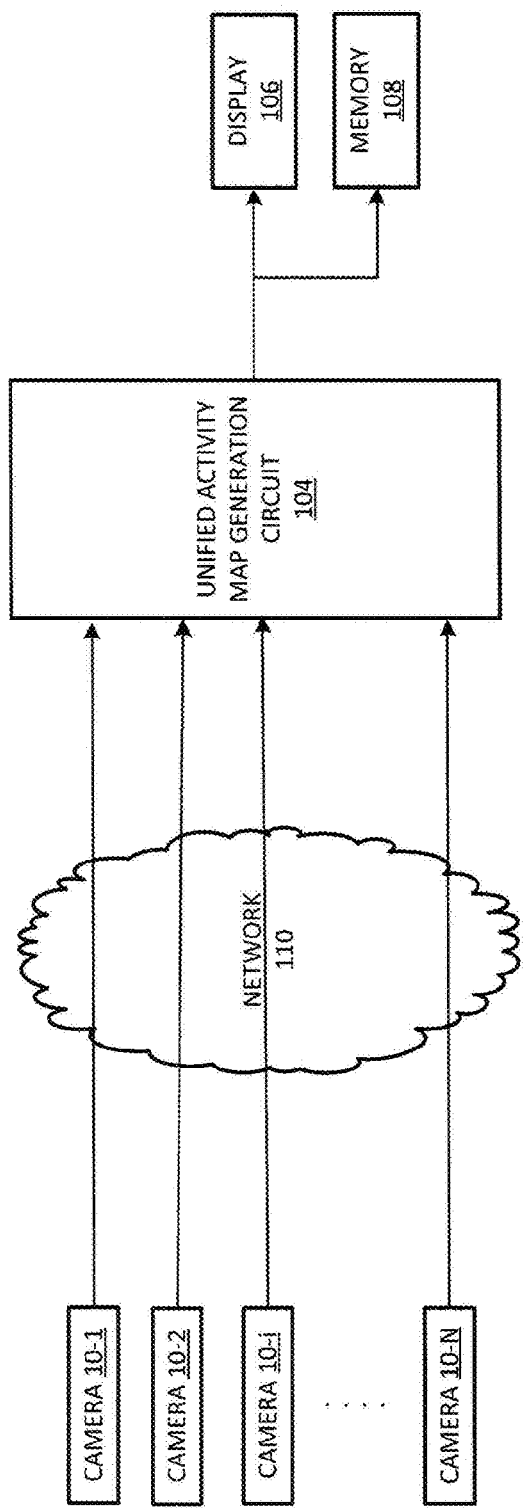
FIG. 1 is a block diagram illustrating an activity map generation system according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Activity maps for a given field of view of a camera reflect relative activity of objects of interest over time with respect to spatial locations within the field of view. As discussed herein, "activity" of a particular feature is defined as occurring at regions of motion of objects of interest in a sequence of video frames. Examples of spatial activity features include: density; dwell; direction; bi-direction; and velocity.

The density feature is indicative of a density of movement of objects of interest over time. The dwell or non-activity feature is indicative of a time that objects of interest remain (or dwell) in an area. The direction and bi-direction features are indicative of the direction of movement of objects of interest over time.

For each camera, an activity map may be generated for each activity feature showing relative activity (e.g., density, dwell, direction, bi-direction, etc.) for objects of interest in the camera's field of view over time. In one example, activity maps for density and dwell features may be probability (or density) functions of activity feature values accumulated over time at each pixel location in a camera's field of view.

Activity maps may be visually rendered (e.g., as histograms and/or heat maps) to display the relative activity of objects of interest over time. According to at least some example embodiments, activity maps may display a single feature, such as spatial density accumulated over time, and multiple activity maps for different activity features may be overlayed to display multiple activity maps to a user concurrently and/or simultaneously. The one or more unified spatial activity maps may also be aligned and overlayed with corresponding trajectory graphs.

With regard to the density feature, a heat map may be used to visualize the density of people movement over time. Pseudo colors may be used to quantize levels in the probability density function at different locations. In one example, a sequence of red, orange, yellow, green, and blue may be used to represent highest to lowest densities.

The dwell feature may be detected by identifying objects of interest (e.g., people) by physical appearance (e.g., clothing color, body, face, etc.) and measuring the time that the objects of interest remain (or dwell) in an area. For the case of a moving crowd, stopped motion can also be detected as an anomalous static region within otherwise smooth movement.

Figure 5A:
FIG. 5A illustrates an example of a hallway junction field of view.

FIG. 5A illustrates an example of a hallway junction field of view of a camera. In this example, the camera is mounted to the ceiling in the hallway of a building.

Figure 5B:
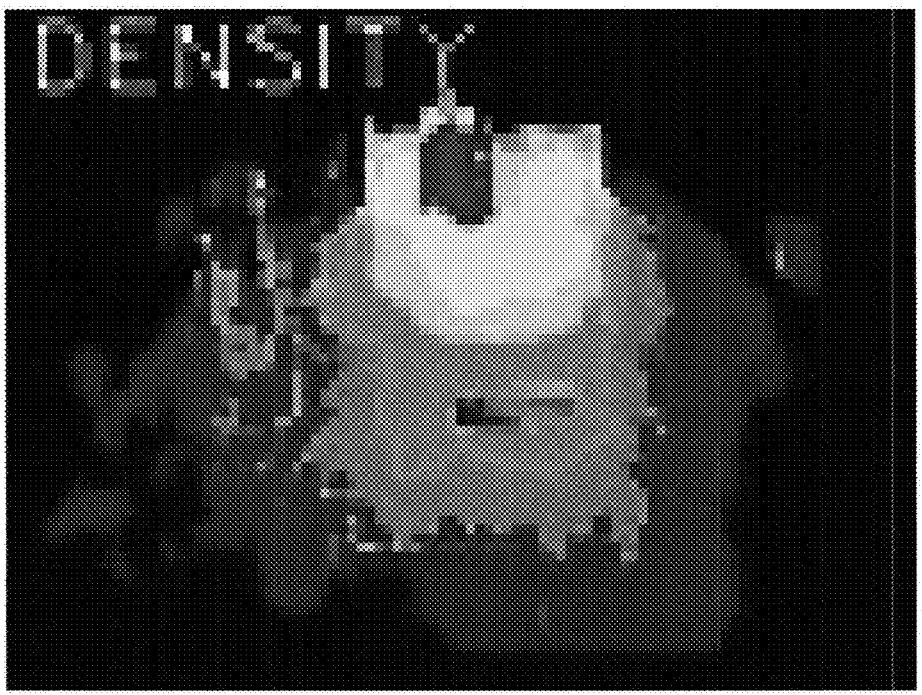
FIG. 5B is an activity map represented as a heat map illustrating spatial density over time in image coordinates for the field of view shown in FIG. 5A.

FIG. 5B is an example activity map represented as a heat map illustrating spatial density over time in image coordinates for the field of view shown in FIG. 5A.

Figure 5C:
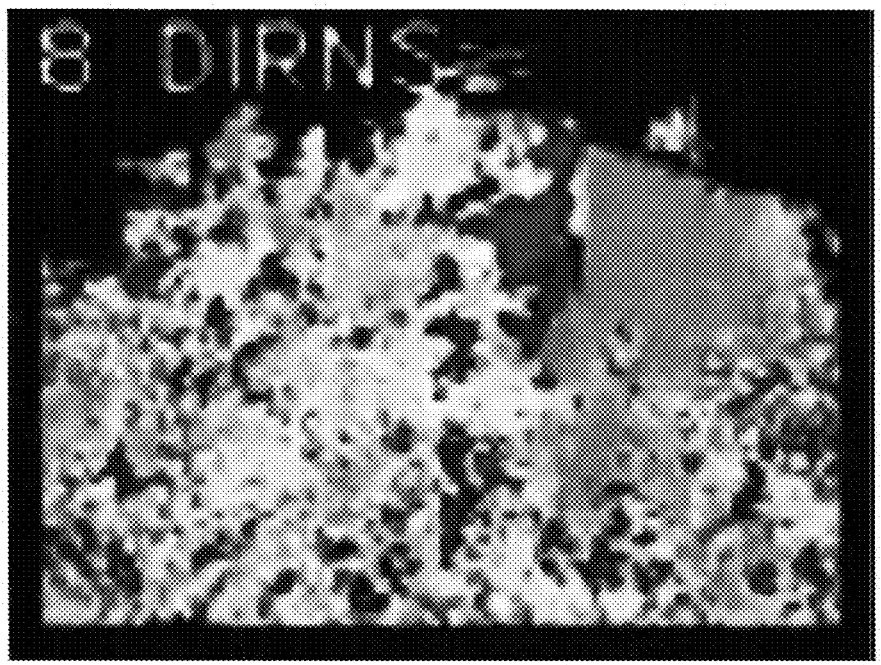
FIG. 5C is an example activity map represented as a heat map illustrating a direction feature over time in image coordinates for the hallway junction shown in FIG. 5A.
Figure 5D:
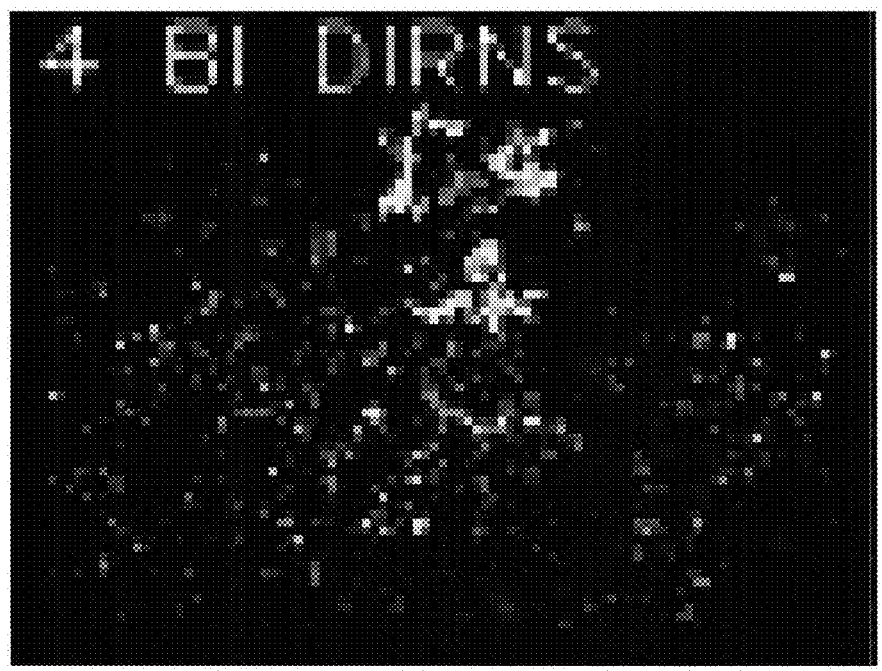
FIG. 5D illustrates an activity map represented as a heat map illustrating the bi-direction feature over time in image coordinates for the hallway junction shown in FIG. 5A.

FIGS. 5C and 5D are example activity maps represented as heat maps for the hallway junction shown in FIG. 5A. More specifically, the heat map shown in FIG. 5C is a visual representation of a direction feature activity map in image coordinates, and the heat map shown in FIG. 5D is a visual representation of a bi-direction feature activity map in image coordinates. The direction (or bi-direction) feature represents the direction of motion of objects of interest over time.

Figure 5E:
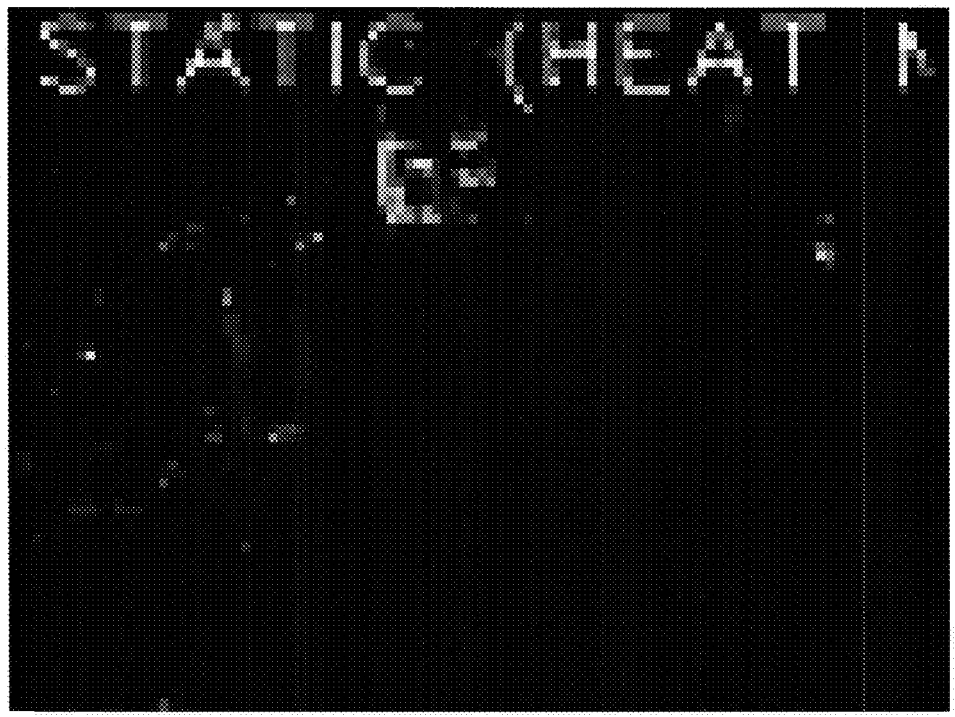
FIG. 5E illustrates an activity map represented as a heat map illustrating the dwell feature over time in image coordinates for the hallway junction shown in FIG. 5A.

FIG. 5E is a heat map representation of an example dwell feature activity map in image coordinates for the hallway junction in FIG. 5A.

When a network of cameras contains cameras without overlapping views (i.e., no spatial continuity between cameras), activity maps may also include inter-view or spatio-temporal features to improve accuracy. These features may be represented by a geographic and/or trajectory graph.

A geographic graph simply describes the physical location of cameras, such as longitude/latitude, street map location, or relative location (e.g., camera A is 100 meters due north of camera B), along with connectivity between cameras. The connectivity may be via streets, hallways, common paths, etc.

Trajectory graphs better describe activity between cameras via characteristics such as: (i) a probability of moving between cameras or camera nodes (e.g., from camera node A to camera node B) on the graph; and/or (ii) an estimated time to move between cameras (e.g., from camera node A to camera node B). An example of a trajectory graph being more informative than a geographic map is a situation in which camera A is spaced 100 meters apart from camera B on the geographic map, but asymmetric in time to move from A-to-B and B-to-A due to an incline between them (e.g., uphill from A to B, but downhill from B to A). As is known, average attributes of a trajectory graph may be learned in an unsupervised manner by correlating events between cameras. When activity is not spatially continuous (i.e., crosses between camera views), the magnitude signal of the activity between cameras may be correlated over time to determine inter-node probability and time.

Instead of a statistical approach, single events may be matched between cameras by event adjacency or recognition (e.g., face recognition).

Activity maps generated according to example embodiments may include spatial activity features beyond only the density feature commonly rendered and displayed as a heat map. For example, activity maps generated according to one or more example embodiments may include spatial activity features such as, direction, bi-direction, dwell time, etc. The activity maps may be associated with multiple different cameras having different fields of view and/or different orientations. Moreover, these activity maps may be represented visually as heat maps and overlayed on one another to be displayed to a user simultaneously and/or concurrently as a unified activity map. The one or more unified spatial activity maps may also be aligned and overlayed with corresponding trajectory graphs.

Unified activity maps generated according to one or more example embodiments may include both spatial and temporal features within a multi-camera network for consistent comparison among different cameras. Moreover, in accordance with one or more example embodiments, both spatial and temporal features are determined from the same motion edge based detection method. As discussed herein, spatial activity features (or spatial features) refer to features from the activity maps, such as density, direction, bi-direction, velocity, and dwell. Temporal activity features (or temporal features) refer to features from the trajectory map, such as time of trajectory from one camera node to another camera node.

FIG. 1 is a block diagram illustrating an activity map generation system according to an example embodiment. The activity map generation system shown in FIG. 1 may cover a relatively wide area, such as a one or more floors of a building, a shopping mall, an airport, a city block, a neighborhood, etc. The system shown in FIG. 1 is configured to monitor movement of objects of interest in a relatively wide area.

As shown in FIG. 1, the activity map generation system includes a plurality of video cameras 10-1, 10-2, 10-i, ..., 10-N connected to a unified activity map generation circuit 104 via a network 110. The plurality of video cameras 10-1, 10-2, 10-i, ..., 10-N may be a network of Internet Protocol (IP)-enabled cameras capable of transmitting video content to a central server and/or the unified activity map generation circuit 104 in real-time or after having obtained a certain length or amount of video content.

Each of the plurality of cameras 10-1, 10-2, 10-i, ..., 10-N may be mounted (e.g., to a wall, on a building, in the corner of a room or hallway, etc.) so as to capture video content and/or images of a particular field of view. The field of views of the plurality of cameras need not overlap (e.g., spatially).

As mentioned above, FIG. 5A illustrates an example of a hallway junction field of view of a camera mounted to the ceiling in the hallway of a building.

Figure 6:
FIG. 6 illustrates an example of a subway platform field of view.

FIG. 6 illustrates an example of a subway platform field of view of a camera. In this example, the camera is mounted to the side of a building so as to obtain a substantially vertical view of the subway platform in the field of view of the camera.

Returning to FIG. 1, the network 110 may include one or more communications networks. For example, the network 110 may be the Internet, an intranet (e.g., an office, home, etc.), a wide area network (WAN), a metropolitan area network (MAN), local area network (LAN), wireless and/or wired, one or more wireless networks, etc.

As mentioned above, the unified activity map generation system shown in FIG. 1 further includes a unified activity map generation circuit 104. The unified activity map generation circuit 104 and/or any components thereof may be hardware, firmware, hardware executing software or any combination thereof. When the unified activity map generation circuit 104 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the unified activity map generation circuit 104. CPUs, DSPs, ASICs and FPGAs may generally be referred to as processors and/or microprocessors.

The unified activity map generation circuit 104 is an apparatus for monitoring movement of objects of interest in a relatively wide area through the use of unified activity maps. In more detail, the unified activity map generation circuit 104 generates one or more unified activity maps based on the video content obtained by the plurality of video cameras 10-1, 10-2, 10-i, ..., 10-N by combining activity feature maps for multiple cameras. As discussed herein, a unified activity map is an activity map whose feature values are displayed as if all cameras were viewing from a single, common angle. In one example, the single angle may be constrained to be consistent with an orthographic view. As a result, according to at least some example embodiments, all feature data is displayed as if the data were captured by a camera looking down at about 90 degrees (or substantially normal) to the surface upon which the activity is being measured.

The unified activity map generation circuit 104 also generates one or more trajectory graphs based on the video content obtained by the plurality of video cameras 10-1, 10-2, 10-i, ..., 10-N. Because methods for generating trajectory graphs are well-known, only a brief discussion will be provided later.

In one example, the unified activity map generation circuit 104 may generate a unified density activity map by combining density activity maps for each of the plurality of video cameras 10-1, 10-2, 10-i, ..., 10-N. In another example, the unified activity map generation circuit 104 may generate a unified dwell activity map by combining dwell activity maps for each of the plurality of video cameras 10-1, 10-2, 10-i, ..., 10-N. In still another example, the unified activity map generation circuit 104 may generate a unified direction (or bi-direction) activity map by combining direction (or bi-direction) activity maps for each of the plurality of video cameras 10-1, 10-2, 10-i, ..., 10-N.

The unified activity map generation circuit 104 outputs the one or more unified activity maps to the display 106 and/or a memory 108. In one example, the display 106 displays the one or more unified activity maps to a user (e.g., as one or more heat maps). The one or more unified activity maps may be overlayed on one another for display to the user. In this case, the user is able to view a plurality of unified activity maps simultaneously or concurrently.

In another example, the one or more unified activity maps are stored in the memory 108 for future viewing or use in future calculations. In still another example, the one or more unified activity maps may be displayed to a user by the display 106 and stored in the memory 108. The unified activity map generation circuit 104 and example functionality thereof will be described in more detail below.

In the example embodiments discussed herein, each of the plurality of video cameras 10-1, 10-2, 10-i, ..., 10-N is assumed to have a different corresponding field of view, and each activity map includes a spatial activity feature associated with moving objects of interest (e.g., people, vehicles, etc.) in the corresponding field of view.

Figure 2:
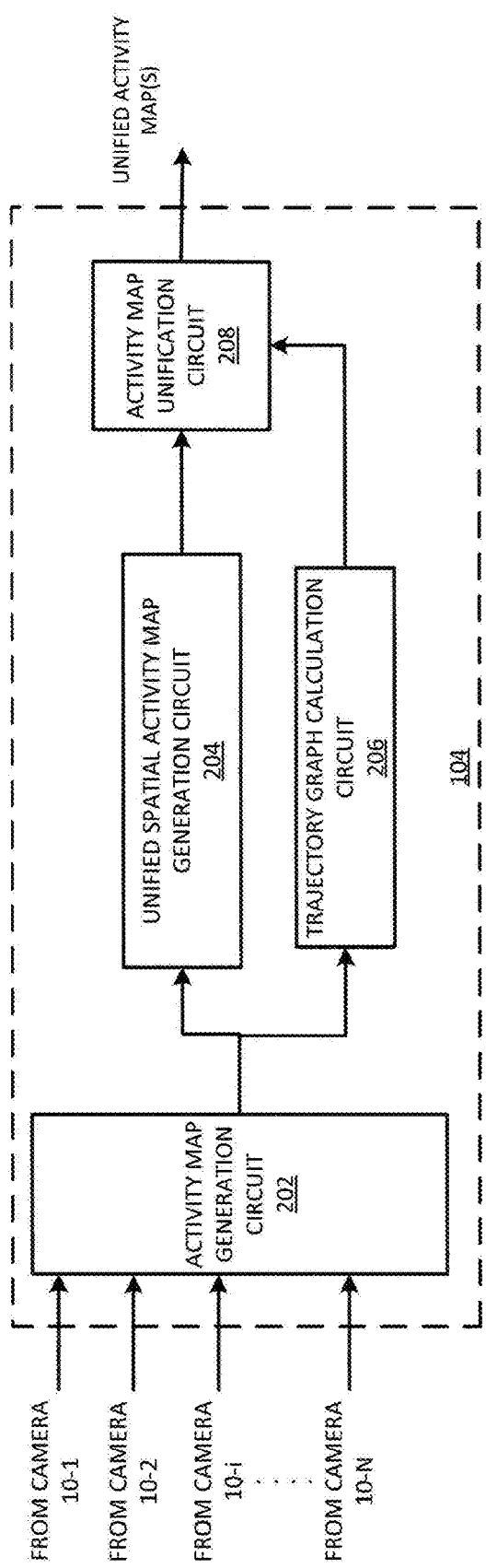
FIG. 2 is a block diagram illustrating an example embodiment of the unified activity map generation circuit 104 shown in FIG. 1.

FIG. 2 is a block diagram illustrating an example embodiment of the unified activity map generation circuit 104 shown in FIG. 1.

Referring to FIG. 2, the unified activity map generation circuit 104 includes: an activity map generation circuit 202; a unified spatial activity map generation circuit 204; a trajectory graph calculation circuit 206; and an activity map unification circuit 208.

As discussed above with regard to the unified activity map generation circuit 104, one or more of the activity map generation circuit 202, the unified spatial activity map generation circuit 204, the trajectory graph calculation circuit 206, and the activity map unification circuit 208 may be hardware, firmware, hardware executing software or any combination thereof. When implemented as hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the activity map generation circuit 202, the unified spatial activity map generation circuit 204, the trajectory graph calculation circuit 206, and/or the activity map unification circuit 208. CPUs, DSPs, ASICs and FPGAs may generally be referred to as processors and/or microprocessors.

Example functionality of the unified activity map generation circuit 104 and its components will be described in more detail below with regard to FIG. 3.

Figure 3:
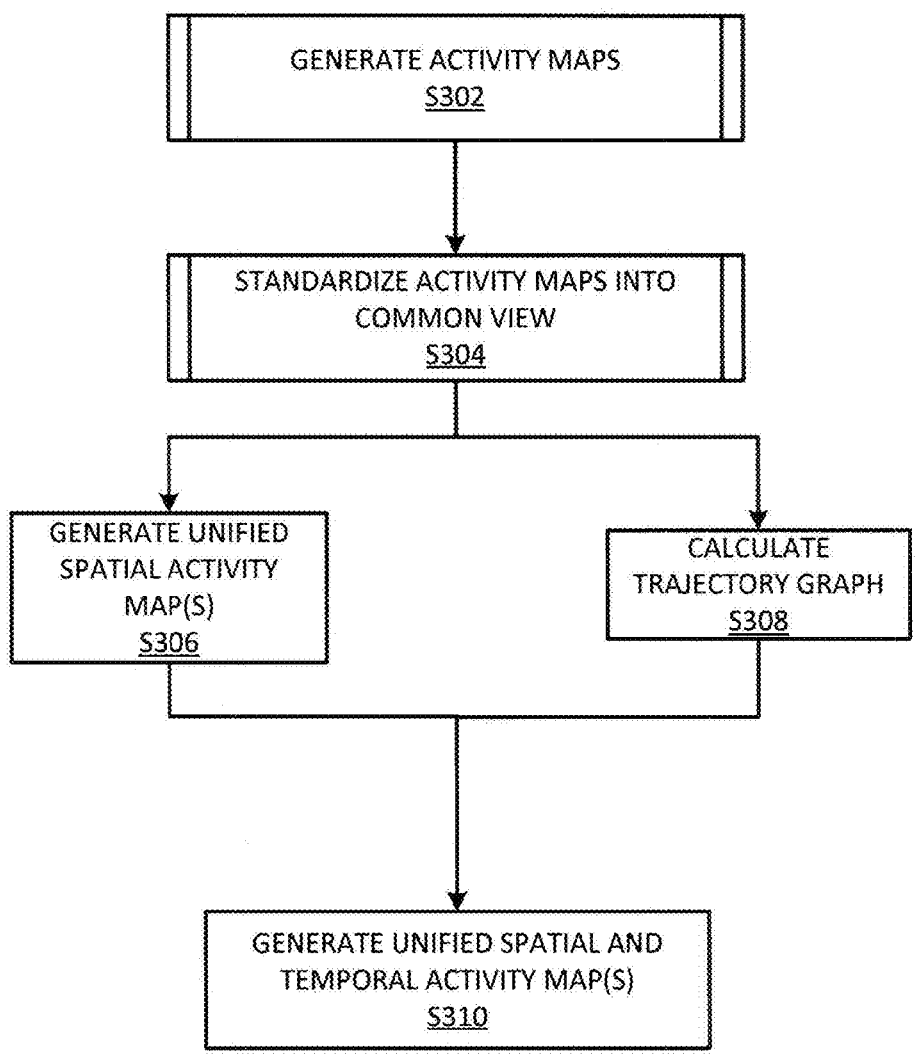
FIG. 3 is a flow chart illustrating an example embodiment of a method for generating one or more unified activity maps.

FIG. 3 is a flow chart illustrating an example embodiment of a method for generating a unified activity map.

Referring to FIG. 3, at step S302 the activity map generation circuit 202 generates a plurality of activity maps based on video content from the plurality of video cameras 10-1, 10-2, 10-i, . . . , 10-N. In one example, the activity map generation circuit 202 generates a set of activity maps for each of the plurality of cameras 10-1, 10-2, 10-i, . . . , 10-N using a same single motion blur method. According to at least this example embodiment, each set of activity maps includes an activity map for each of a plurality of activity features. As discussed above, the plurality of activity features may include: density; dwell; direction; bi-direction; and/or velocity.

As discussed herein, an activity map may be referred to as a two-dimensional (2D) histogram or a 2D probability density function. Histogram values may be divided by the sum of histogram values to obtain a probability density function.

In the examples discussed above, activity maps for density and dwell features are probability or density functions of those activity feature values accumulated over time at a given pixel location.

The activity map for the direction (or bi-direction) feature (also referred to as a direction map or direction activity map) shows the dominant direction of motion $\underline{d}$ at pixel locations in the field of view of a camera over a period of time. In other words, an activity map for the direction (or bi-direction) feature reflects a number of times a direction of movement has occurred at a given pixel over the time that the activity map data has been captured. As with dwell and density, this direction activity map is a histogram, and the histogram values may be divided by the sum of histogram values to obtain a probability density function.

The activity map for the velocity feature (also referred to as a velocity map or velocity activity map) shows the velocity of motion $\underline{v}$ at pixel locations in the field of view of a camera over a period of time. In other words, an activity map for the velocity feature reflects a number of times a velocity of movement has occurred at a given pixel over the time that the activity map data has been captured. Velocity is captured as continuous numbers from 0 to maximum measured velocity, and these are quantized into a few levels (e.g., 6-8 levels), which are accumulated in a histogram. As with direction, dwell and density, the velocity activity map is a histogram, and the histogram values may be divided by the sum of histogram values to obtain a probability density function.

An example embodiment of a method for generating activity maps will be discussed in more detail later with regard to FIG. 7.

Still referring to FIG. 3, each of the activity maps generated at step S302 are generated in image coordinates; that is, in the image view of a respective camera. In order for activity maps from multiple cameras with different fields of view to be viewed commonly in a unified activity map, the activity maps must be standardized into a single common view. To do so, activity maps are transformed from the image view to the world view.

At step S304, the activity map generation circuit 202 standardizes the activity maps in each set into a single common world view. In one example, the single common world view is the orthographic view. Example embodiments of methods for transforming the plurality of activity maps will be discussed in more detail later, for example, with regard to FIGS. 4, 8 and 9.

The activity map generation circuit 202 then outputs the standardized plurality of activity maps to the unified spatial activity map generation circuit 204 and the trajectory graph calculation circuit 206.

At step S306 the unified spatial activity map generation circuit 204 generates a unified spatial activity map for each activity feature based on the plurality of standardized activity maps for each activity feature. For example, the unified spatial activity map generation circuit 204 generates a unified density activity map based on the plurality of standardized density activity maps. In another example, the unified spatial activity map generation circuit 204 generates a unified dwell activity map based on the plurality of standardized dwell activity maps. So, in this context the unification by the unified spatial activity map generation circuit 204 refers to unification or visualization of the activity feature views of each of the plurality of video cameras on one activity map. The unified spatial activity map generation circuit 204 outputs the unified spatial activity map for each activity feature to the activity map unification circuit 208.

In parallel with step S306, at step S308 the trajectory graph calculation circuit 206 generates one or more trajectory graphs to correlate the standardized activity maps. In so doing, the trajectory graph calculation circuit 206 correlates activity per camera. The trajectory graph calculation circuit 206 may generate the trajectory graphs based on the plurality of standardized activity maps in any well-known manner.

As discussed above, trajectory graphs describe activity between cameras via characteristics such as: (i) a probability of moving between camera nodes and/or an estimated time to move between camera nodes. When activity is not spatially continuous (i.e., crosses between camera views), the magnitude signal of the activity between cameras may be correlated over time to determine inter-node probability and time.

In a more specific example, if camera nodes A and B in a graph are related by 4 features (e.g., probability of moving from camera A to camera B (P(AB)), probability of moving from camera B to camera A (P(BA)), time to move from camera A to camera B ($t_{AB}$), and time to move from camera B to camera A ($t_{BA}$), then the probability P(AB) is the average proportion of events that correlate from camera A to camera B with respect to all events that correlate from camera A to another node having correlated events. Time duration $t_{AB}$ is the average lag between an event at camera A and the corresponding one at camera B. Because methods for generating trajectory graphs are well-known, a more detailed discussion is omitted.

The trajectory graph calculation circuit 206 outputs the generated trajectory graph to the activity map unification circuit 208.

At step S310, the activity map unification circuit 208 generates one or more unified spatial and temporal activity maps based on the one or more unified spatial activity maps from the unified spatial activity map generation circuit 204 and the trajectory graphs from the trajectory graph calculation circuit 206. In one example, the unified spatial activity maps and trajectory graphs are rendered visually, aligned and then overlayed on one another to be displayed to a user either individually, simultaneously or concurrently. The visual rendering, alignment and overlaying may be done in any well-known manner. In one example, the unified density activity map may be rendered visually, aligned and overlayed with a corresponding trajectory graph to be displayed to a user. In another example, the unified dwell activity map may be rendered visually, aligned and overlayed with a corresponding trajectory graph to be displayed to a user.

Figure 10:
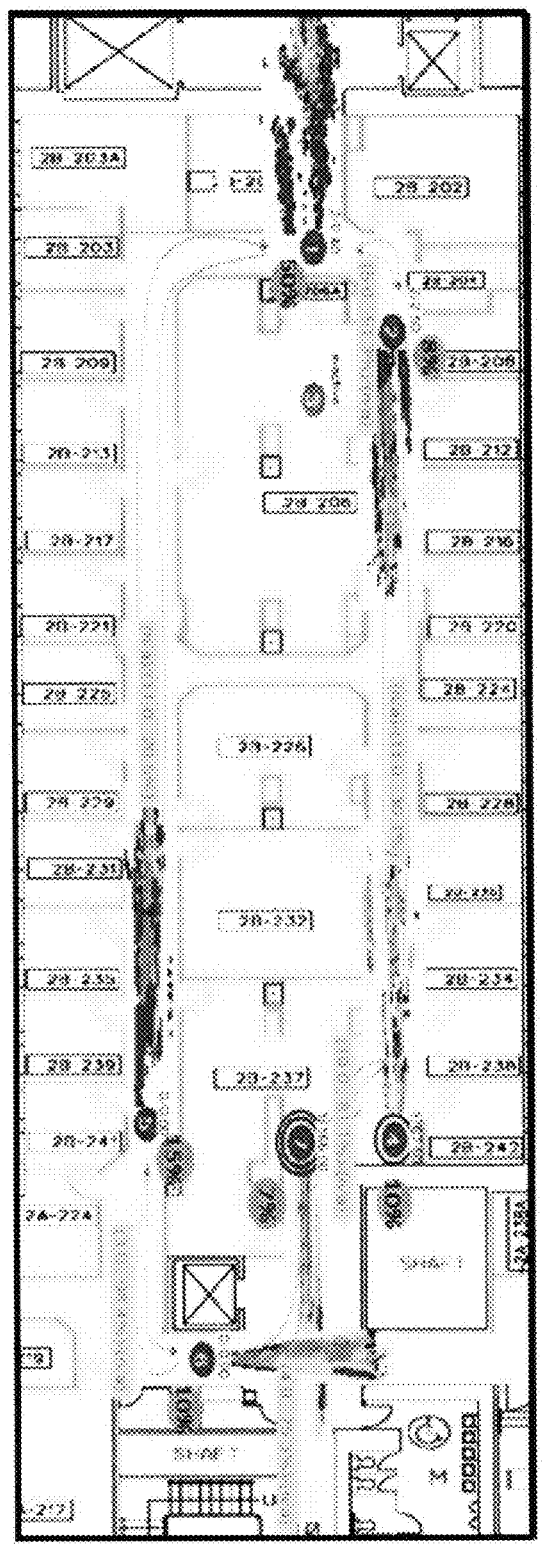
FIG. 10 illustrates an example unified activity map generated according to example embodiments.

FIG. 10 illustrates an example unified activity map generated according to example embodiments. In the unified activity map shown in FIG. 10, multiple camera views are spatially and temporally unified into a unified wide area map viewed orthographically. Camera numbers are shown in circles, and the percentages represent density normalization percentages. The trajectory graphs are represented as arrows between cameras, and their inter-node times and probabilities are also shown.

Activity Map Generation

Figure 7:
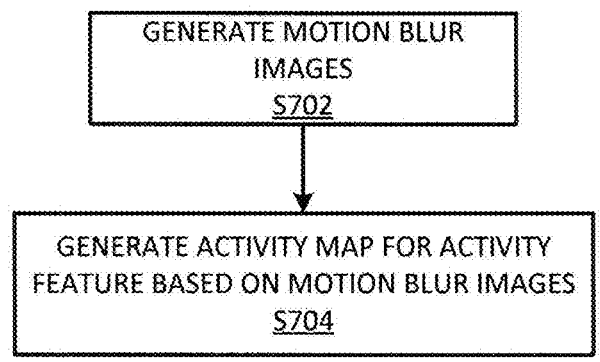
FIG. 7 is a flow chart illustrating an example embodiment of step S302 in FIG. 3.

FIG. 7 is a flow chart illustrating an example embodiment of a method for generating one or more activity maps for the i-th video camera 10-i shown in FIG. 1. As discussed with regard to this example, the video content from the i-th camera 10-i is assumed to include a sequence of T image frames. Image frames are also referred to herein as "video frames" or "frames".

Generating Motion Blur Images

Referring to FIG. 7, at step S702 the activity map generation circuit 202 generates a motion blur image $B_t$ corresponding to each image frame t in the sequence of T frames. The motion blur image $B_t$ for the t-th frame may also be designated as $B(x,y,t)$, where x and y are pixel coordinates of a motion blur image pixel in the image coordinate plane, and t is the index of the frame in the sequence of T frames. For the sake of clarity, in some instances the method shown in FIG. 7 will be discussed with regard to the t-th frame of video content. However, the activity map generation circuit 202 generates a motion blur image corresponding to each of the T frames of video content from the i-th camera 10-i in the same manner as discussed with regard to the t-th frame. And, as discussed in more detail below, the motion blur image for each t-th frame (i.e., $B(x,y,t)$) depends on motion images for each of the previous frames.

In more detail, for each of the T frames, at step S702 the activity map generation circuit 202 generates and quantizes an oriented spatial gradient $G^*$ for each pixel $(x,y)$ according to Equation (1) shown below.

$$G_t^*(x,y)=sgn_G(\max\{|G_x|>\tau,|G_y|>\tau,0\})\epsilon\{G^+,G^-,G^0\} \quad (1)$$

In more detail, according to Equation (1), each pixel location $(x,y)$ in the t-th frame is labeled as a positive $(G^+)$ or negative $(G^-)$ gradient slope if the gradient $G_x$ or $G_y$ is above a threshold $(\tau)$. Otherwise, the pixel location $(x,y)$ is labeled as a null gradient slope $G^0$. The threshold $\tau$ may be user-defined and in a range between 0 and a maximum gradient (e.g., 0 to 255). In one example, the threshold $\tau$ may be about ten percent of the maximum gradient or about 25.

The activity map generation circuit 202 then determines motion as the difference $D_{m \times m}$ in edge textures for the pixel $(x,y)$ between the T frames, where edge textures are defined as $m \times m$ sized windows of the oriented spatial gradients around the pixel $(x,y)$ in accordance with Equation (2) shown below.

$$D_{m \times m}(x,y,t)=\max_i(\Sigma_{m \times m}\Delta_i(x,y,t)), i=\{0,1,2,3\} \quad (2)$$

In Equation (2), $\Delta_i$ is the difference between the current gradient label $G^*(x,y,t)$ at pixel location $(x,y)$ for frame t and a running average over gradient labels of previous ones of the T frames $\underline{G}^*(x,y,\Delta t)$ at the pixel location $(x,y)$. The difference $\Delta_i$ may have one of 4 possible values: $\Delta_1$, $\Delta_2$, $\Delta_3$ and $\Delta_4$, where:

(i) the pixel location $(x,y)$ has a difference $\Delta_1$ when the gradient for the current frame t and the gradient for the running average over previous frames is null (i.e., $G^*=\underline{G}^*=G^0$);

(ii) the pixel location $(x,y)$ has a difference $\Delta_2$ when the gradient for the current frame t and the gradient for the running average over previous frames is non-null (i.e., $G^*=\underline{G}^*\neq G^0$);

(iii) the pixel location $(x,y)$ has a difference 43 when the gradient for the current frame t and the gradient for the running average over previous frames are different (i.e., $G^*\epsilon\{G^+,G^-\},\underline{G}^*\neq G^0$; different, foreground gradient); and (iv) the pixel location $(x,y)$ has a difference $\Delta_4$ when the gradient for the current frame t and the gradient for the running average over previous frames is different and non-null (i.e., $\underline{G}^*\epsilon\{G^+,G^-\},G^*\neq G^0$; different, background gradient).

The difference $D_{m \times m}(x,y,t)$ for the m×m sized window around pixel location $(x,y)$ has 4 possible outcomes:

$D_1$: no texture;

$D_2$: same texture;

$D_3$: different with predominant foreground texture; and $D_4$: different with predominant background texture (these are areas where a non-textured foreground occludes a textured background).

The m×m sized window labeled with outcome $D_3$ represents moving foreground. In this case, the pixel is identified as a motion image frame pixel. An image frame including pixels labeled with outcome $D_3$ is referred to herein a motion image frame or motion image $M(x,y,t)$. The motion image $M(x,y,t)$ is defined more specifically as shown below in Equation (3).

$$M(x,y,t)=\begin{cases} 1, & \text{if } D(x,y)=D_3 \\ 0 & \text{otherwise} \end{cases} \quad (3)$$

After having determined motion within the T frames, the activity map generation circuit 202 generates a motion blur image $B(x,y,t)$ corresponding to each frame t by combining the motion images $M(x,y,t)$ of K1 previous frames $M(x,y,t-k)$, for $k=1,\ldots,K1$, and multiplying their values by monotonically decaying weights $u_k$. In a more specific example, the activity map generation circuit 202 generates a motion blur image $B(x,y,t)$ for each of the T frames according to Equations (4) and (5) shown below. The motion blur images corresponding to the T frames may be referred to as a set of motion blur images or set of motion blur image frames.

$$B(x,y,t)=U_{k=1}^{K1}u_kM(x,y,t-k) \quad (4)$$

$$u_k=T-k+1, \text{ where } 1\leq k\leq K1, T\geq K1 \quad (5)$$

Equation (4) describes a "weighted logical OR", where the result is not 0 or 1, but $u_k$ if $M(x,y,t-k)=1$, or 0 otherwise. As discussed herein, a motion edge is a foreground edge that is not in the static background edges, which are computed over time. A motion edge that moves over the static background is a motion edge, but if the motion edge stops moving, then it is a "static" motion edge, which is distinguishable from the static background edges. A motion edge occurs at each pixel location (x,y) in an image frame where B(x,y,t)=$u_k$, but does not occur at pixel locations (x,y) where B(x,y,t)=0. The resultant motion blur image B(x,y,t) for frame t contains the highest weight for edges of frame t, and 1 less weighting for each previous frame, appearing like a blurred edge image. The resultant blur image frame B(x,y,t) resembles a single snapshot of edges of an object that moved causing blurring.

Generating Activity Maps

Returning to FIG. 7, after generating the motion blur images, at step S704 the activity map generation circuit 202 generates one or more activity maps for one or more activity features. In one example, for each camera, the activity map generation circuit 202 generates an activity map for each of the activity features. In other words, although discussed in some cases with regard to the i-th camera, the activity map generation circuit 202 may generate an activity map corresponding to each of the plurality of activity features for each of the plurality of cameras shown in FIG. 1.

As discussed above, the activity features may include, for example: density, dwell, direction, and bi-direction. In one example, the activity map generation circuit 202 generates an activity map for density probability $P_D$; an activity map for dwell probability $P_W$, an activity map for direction feature value $F_\theta$; and an activity map for bi-direction feature value $F_\beta$. As with step S702, step S704 is discussed with regard to the i-th video camera 10-i.

According to at least some example embodiments, the density and dwell probabilities have a continuous range [0-1.0], and the direction and bi-direction feature values have discrete range of integers [0-7] for direction and [0-3] for bi-direction. Each of these activity maps will be discussed in more detail below.

Density Activity Map

The activity map for the density feature includes a density probability value for each pixel location (x,y) in the field of view of the i-th camera 10-i. Accordingly, to generate the activity map for the density feature for the i-th, the activity map generation circuit 202 calculates the density probability $P_D$ for each pixel location (x,y) in the field of view of the i-th camera. In more detail, the activity map generation circuit 202 accumulates the number of frames in which a motion edge occurs at the pixel location (x,y) over given time window of frames (e.g., from time t–K2 to t), and then normalizes this accumulation by the sum S of the accumulated motion pixel frames over time and over all pixels in a motion image M(x,y,t). In one more detailed example, the activity map generation circuit 202 calculates the density probability $P_D$ according to Equation (6) shown below.

$$P_D(x, y, t) = \frac{1}{S}\sum_{k=0}^{K2} M(x, y, t-k) \tag{6}$$

In Equation (6), the sum S is given by Equation (7) shown below.

$$S = \sum_{x,y} \sum_{k=0}^{K2} M(x, y, t-k) \tag{7}$$

As a result of this accumulation, the activity map generation circuit 202 obtains the activity map in the form of a density value for each pixel location (x,y) in the field of view of the i-th camera 10-i.

Dwell Activity Map

The activity map for the dwell feature includes a dwell probability value for each pixel location (x,y) in the field of view of the i-th camera 10-i. Accordingly, the activity map generation circuit 202 generates an activity map for the dwell feature by calculating the dwell probability $P_W$ at each pixel location. In more detail, to calculate the dwell probability $P_W$ at each pixel location the activity map generation circuit 202 accumulates the number of motion blur image frames for which a motion edge at a pixel location (x,y) remains static over a time window (e.g., t–K2 to t), and normalizes the accumulated number by the sum S shown above in Equation (7). More specifically, the activity map generation circuit 202 calculates the dwell probability $P_W$ at each pixel location according to Equation (8) shown below.

$$P_W(x, y, t) = \frac{1}{S}\sum_{k=0}^{K2} M^*(x, y, t-k) \tag{8}$$

In Equation (8), M*(x,y, t)=1 if M(x,y, t)=1 and M(x,y, t–1), and M*(t)=0 otherwise. That is, M*(x,y,t) is 1 if a motion edge is static at a pixel location (x,y) for two or more consecutive image frames (e.g., (t–1) and t) in the sequence of T frames.

The calculated dwell probability values may be quantized into colors as discussed above in any well-known manner.

Direction/Bi-Direction Activity Map

The activity map for the direction feature includes a direction of motion value for each pixel location (x,y) in the field of view of the i-th camera 10-i. Similarly, the activity map for the bi-direction feature also includes a direction of motion value for each pixel location (x,y) in the field of view of the i-th camera 10-i

To generate an activity map for the direction (and/or bi-direction) feature for the i-th camera 10-i, the activity map generation circuit 202 applies linear regression fits in x and y to each motion blur image B(x,y,t), and calculates the direction of motion θ(x,y,t) at each pixel location (x,y) from the slope of the fits, $\rho_x$ (given by Equation (9)) and $\rho_y$ (given by Equation (10)) according to Equation (11) shown below.

$$\rho_x(x, y, t) = \frac{\text{cov}(k, \overline{X_B}(k))}{\text{var}(\overline{X_B}, (k))} \tag{9}$$

$$\rho_y(x, y, t) = \frac{\text{cov}(k, \overline{Y_B}(k))}{\text{var}(\overline{Y_B}, (k))} \tag{10}$$

$$\theta(x, y, t) = \arctan\left(\frac{\rho_y}{\rho_x}\right) \tag{11}$$

In Equation (9), $\overline{X_B}(k)$ is the average motion blur location in the x direction within windows of size $$w \times w, \text{ where } -\frac{w}{2} \le (i, j) \le \frac{w}{2}.$$

The activity map generation circuit 202 calculates the average motion blur locations $\overline{X_B}(k)$ for frame t and for each previous frame 1≤k≤K within w×w sized windows, $$-\frac{w}{2} \le (i, j) \le \frac{w}{2},$$

according to Equation (12) shown below.

$$\overline{X_B}(k) = \sum_{i,j} \frac{(x+i)B_t(x+i, y+j, k)}{w_k} \quad (12)$$

The covariance cov(k, $\overline{X_B}$(k)) and variance var($\overline{X_B}$(k)) of the average motion blur location $\overline{X_B}$(k) in the x direction are given by Equations (13) and (14) shown below.

$$\text{cov}(k, \overline{X_B}(k)) = \sum_{k=1}^{K} k\overline{X_B}(k) - \frac{1}{K}\sum_{k=1}^{K} k \sum_{k=1}^{K} \overline{X_B}(k) \quad (13)$$

$$\text{var}(\overline{X_B}(k)) = \sum_{k=1}^{K} \overline{X_B}^2(k) - \frac{1}{K}\left(\sum_{k=1}^{K} \overline{X_B}(k)\right)^2 \quad (14)$$

In Equation (10) shown above, $\overline{Y_B}$(k) is the average motion blur location in the y direction within the windows of size w×w. The activity map generation circuit 202 calculates the average motion blur location $\overline{Y_B}$(k) for frame t and each previous frame 1≤κ≤K within w×w sized windows, according to Equation (15) shown below.

$$\overline{Y_B}(k) = \sum_{i,j} \frac{(y+j)B_t(x+i, y+j, k)}{w_k} \quad (15)$$

The covariance cov (k, $\overline{Y_B}$(k)) and variance var ($\overline{Y_B}$(k)) of the average motion blur location $\overline{Y_B}$(k) in the y direction are given by Equations (16) and (17) shown below.

$$\text{cov}(k, \overline{Y_B}(k)) = \sum_{k=1}^{K} k\overline{Y_B}(k) - \frac{1}{K}\sum_{k=1}^{K} k \sum_{k=1}^{K} \overline{Y_B}(k) \quad (16)$$

$$\text{var}(\overline{Y_B}(k)) = \sum_{k=1}^{K} \overline{Y_B}^2(k) - \frac{1}{K}\left(\sum_{k=1}^{K} \overline{Y_B}(k)\right)^2 \quad (17)$$

As mentioned above, the activity map for the direction (or bi-direction) feature (also referred to as a direction map or direction activity map) shows the dominant direction of motion $\underline{d}$ at pixel locations in the field of view of a camera over a period of time.

In one example, the activity map generation circuit 202 quantizes directions to $$\frac{\pi}{4}$$

increments and compiles a histogram $h_{xyt}(q)=h(q)$ having q=0, . . . , 7 bins, corresponding to $$\theta_q = \left\{0, \frac{\pi}{4}, \ldots, \frac{7\pi}{4}\right\}.$$

Each bin of the histogram contains the sum of the number of directions corresponding to that direction quantization level over the time period.

The activity map generation circuit 202 then calculates direction activity map values $F_\theta(x,y,t)$ as the circular average (over 0-2π radians) of the angles corresponding to the histogram bins according to Equation (18) shown below.

$$F_\theta(x, y, t) = \arctan\left(\frac{\sum_{q=0}^{7}(h(q)\sin\theta_q)}{\sum_{q=0}^{7}(h(q)\cos\theta_q)}\right) \quad (18)$$

The activity map generation circuit 202 calculates the dominant direction of motion $\underline{d}$ at a given pixel location as the circular average (over 0-2π radians) of all directions $\theta_{i,j}(x,y,t)$ in the above-discussed w×w window, as shown below in Equation (19).

$$\underline{d} = \arctan\left(\frac{\sum_{w \times w} \sin\theta_{i,j}}{\sum_{i,j} \cos\theta_{i,j}}\right) \quad (19)$$

The activity maps for the direction (and bi-direction) feature include a dominant direction $\underline{d}$ for each pixel location in the field of view of a camera.

According to at least some example embodiments, the dominant direction may be one of 8 possible directions (e.g., N, E, S, W, NE, NW, SE, SW). Having found the dominant direction $\underline{d}$ for each pixel location in the camera view, the activity map generation circuit 202 determines that a dominant bi-direction feature is present if the identified direction (e.g., N, E, NE, SE) and its inverse (e.g., S, W, NW, SW, respectively) are dominant among the 4 bi-directions.

The bi-direction feature represents a direction and its opposite direction. The bi-direction feature describes areas where there is 2-way directionality of motion. The 4 bi-directions are quantized:

$$\beta_q = \left\{(0, \pi), \left(\frac{\pi}{4}, \frac{5\pi}{4}\right), \left(\frac{\pi}{2}, \frac{3\pi}{2}\right), \left(\frac{3\pi}{4}, \frac{7\pi}{4}\right)\right\}.$$

The activity map for the bi-direction feature shows dominant bi-directions given by Equation (20) shown below.

$$F_\beta(x, y, t) = \begin{cases} \beta_{q1}, & \text{if } h_{xyt}(\theta_{|q1+4|8}) > ch_{xyt}(\theta_{q1}) \\ 0, & \text{otherwise} \end{cases} ; \quad (20)$$

In Equation (20), c=(0,1.0), and is chosen to be close to 1.0 (e.g., about 0.9); q1 is the histogram bin corresponding to the dominant direction $\underline{d}$, and $|*|_8$ denotes modulo-8 arithmetic. A dominant bi-direction occurs when one direction is dominant among the 8 directions, and the direction opposite to the dominant direction has histogram weighting almost as high.

Standardizing Activity Maps

Returning to FIG. 3, each of the activity maps are generated in image coordinates; that is, in the image view of a respective camera. In order for activity maps from multiple cameras with different fields of view to be viewed commonly in a unified activity map, the activity maps must be standardized into a single common view. To do so, activity maps are transformed from the image view to the world view. As discussed herein, a transformed variable is denoted by a prime (e.g., x→x'). Five transformations are described in more detail below.

Figure 4:
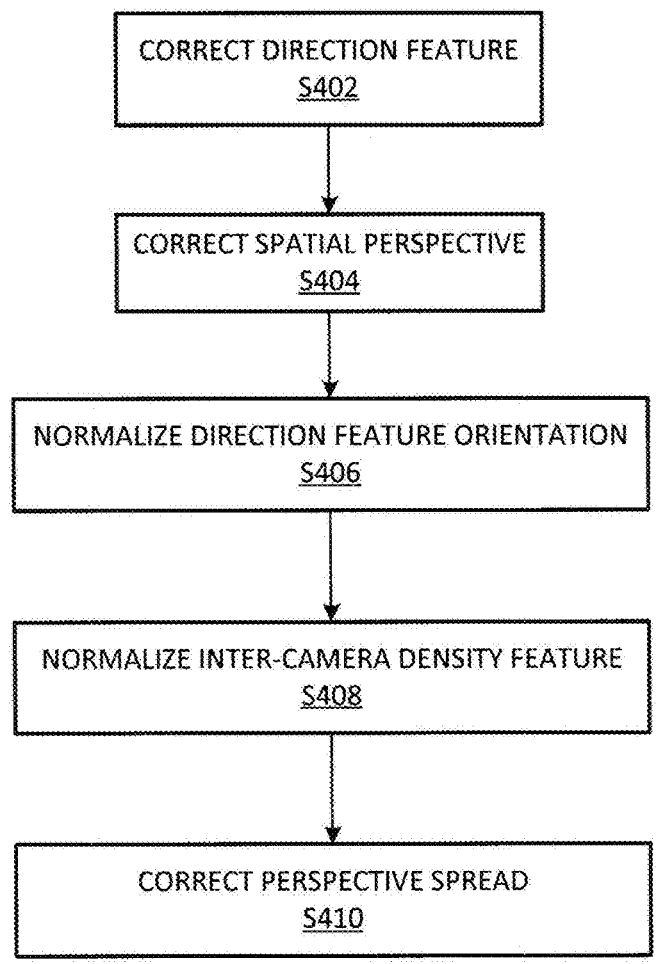
FIG. 4 is a flow chart illustrating an example embodiment of a method for standardizing activity maps into a common view.

As discussed above, at step S304 in FIG. 3, the activity map generation circuit 202 standardizes the activity maps generated for each camera into a single common world view. FIG. 4 is a flow chart illustrating an example embodiment of a method for transforming activity maps into a common view. Although the steps are shown serially in FIG. 4, these steps may be performed in parallel or serially in any order. For the sake of clarity, the method shown in FIG. 4 will be described with regard to activity features and activity maps associated with the i-th video camera. However, the same steps may be performed with regard to each of the plurality of video cameras.

Direction Feature Spatial Correction

Referring to FIG. 4, at step S402 the activity map generation circuit 202 corrects the direction feature $\underline{d}$ for the i-th video camera. In so doing, the activity map generation circuit 202 modifies the direction feature $\underline{d}$ (and/or bi-direction feature if present) with respect to tilt of the i-th camera. Intuitively, if the view of the i-th camera is orthographic (view from above or vertical), all directions are measured equivalently or substantially equivalently. However, if the i-th camera is at 0 degrees relative to motion of an object of interest, cross-wise motion is measured correctly, but motion toward and away from the camera is not measured properly. Assuming for the sake of clarity that all motion is on the ground plane in world coordinates quantified to 8 angles at 45° intervals (sometimes referred to herein as, e.g., N, NE, E, SE, S, SW, W, and NW), then there are 2 cases for correction of the quantized directions; namely: i) vertical up and down directions $$\left(\theta_q = \left\{\frac{q\pi}{4}, q = 2, 6\right\}\right)$$

in the image plane are motions away and toward the camera; and ii) diagonal directions $$\left(\theta_q = \left\{\frac{q\pi}{4}, q = 1, 3, 5, 7\right\}\right)$$

in the image plane are diagonal world coordinate motions with respect to the direction of the view of the i-th camera.

If the i-th camera is tilted down at angle $\phi$ from the horizontal, then the direction histogram values $h_{xyt}$ in the image view are corrected proportionally to the reciprocal of the cosine of that angle $\phi$, as shown below in Equation (21).

$$\text{Vertical: } h'_{xyt}(\theta_q) = \frac{h_{xyt}(\theta_q)}{\cos\varphi} \tag{21}$$

If the i-th camera is tilted down at angle $\phi$ from the horizontal, then the image-determined direction histogram values $h_{xyt}$ in the diagonal direction are corrected as shown below in Equation (22).

$$\text{Diagonal: } h'_{xyt}(\theta_q) = \frac{h_{xyt}(\theta_q)}{\sqrt{(0.5(1.0 + \cos^2\varphi))}} \tag{22}$$

Spatial Perspective Correction

At step S404, the activity map generation circuit 202 transforms the spatial perspective of each activity map from image coordinates (in the field of view of the camera) to world coordinates for orthographic viewing.

In image coordinates, a hallway (or railroad track as the stereotypical example) as directly viewed, and with the camera at an angle to the vertical, displays parallel receding lines as converging toward a single point. For orthographic viewing, these image coordinates are converted to world coordinates in which the lines are parallel. Although general camera translation includes 5 degrees of freedom (i.e., tilt, rotation, focus, x, and y), it is assumed that there is no rotation, the focus is fixed and known, and $x_0$ and $y_0$ (the lower left origin of the image in both image and world coordinates) are known. Furthermore, the i-th video camera is assumed to be aimed directly (parallel) down the hallway, sidewalk, or road being viewed.

With these assumptions, the activity map generation circuit 202 calculates two expansion factors $R_x(y)$ and $R_y(y)$ for mapping image coordinates x and y of each pixel in the image plane of the camera field of view to world coordinates x' and y' of each pixel in the orthographic plane.

The expansion factor or transform $R_x(y)$ is a ratio of transformed x' to x as a function of y to map x to x'. The expansion factor or transform $R_y(y)$ is a ratio of transformed y' to y as a function of y to map y to y'.

For the ratio $R_x(y)$, the width decrease with respect to image coordinate y (measured from the bottom of the image corresponding to a real location closest to the camera) may be modeled as an asymptotically decreasing function $$x(y) = \frac{A}{(1 + By)}.$$

And, the transform $R_x(y)$ for converting to the orthographic map is the reciprocal, as shown below in Equation (23).

$$R_x(y) = \frac{x'}{x} = \frac{(1 + Ay)}{B} \tag{23}$$

By solving Equation (23) for x', the transformation for x in image coordinates to x' in world coordinates is given by Equation (24) shown below.

$$x' = xR_x(y) = \frac{x(1 + Ay)}{B} \tag{24}$$

With knowledge of the pixel widths $x_0$ at y=0, and $x_1$ at y=$y_1$, A and B are solved as shown below in Equations (25) and (26), respectively.

$$A = x_0 \quad (25)$$

$$B = \frac{(x_0 - x_1)}{y_1 x_1} \quad (26)$$

As shown below in Equation (27), the transform $R_y(y)$ may be modeled as a parabolic function in which y is the distance in pixels from the bottom of the image (corresponding to the location closest the camera), and y' is the real world distance from the location at the bottom of the image to the location at y in the image.

$$R_y(y) = \frac{y'}{y} = Cy^2 + D \quad (27)$$

By solving Equation (27) for y', the transformation for y in image coordinates to y' in world coordinates is given by Equation (28) shown below.

$$y' = yR_y(y) = y(Cy^2 + D) \quad (28)$$

With knowledge (by measurement) of two ratios $$\left(\text{e.g., } \frac{y'_1}{y_1} \text{ and } \frac{y'_2}{y_2}\right),$$

the values of C and D can be solved using Equations (29) and (30), respectively, shown below.

$$C = \frac{(y'_2 y_1 - y'_1 y_2)}{y_1 y_2 (y_2^2 - y_1^2)} \quad (29)$$

$$D = \frac{y'_1}{y_1 - Cy_1^2} \quad (30)$$

Given the above-discussed transformations, the activity map generation circuit 202 applies the transformation to each activity map to transform the spatial perspective of each activity map from image coordinates to world coordinates, such that each of the activity maps has a common perspective (e.g., the orthographic view).

Direction Feature Orientation Normalization

At step S406, the activity map generation circuit 202 normalizes the orientation of the direction feature activity maps.

Single camera direction activity maps are oriented with respect to their respective camera views. In one example, when direction and bi-direction activity maps from individual cameras are mapped to the unified (in this case orthographic) map, the activity map generation circuit 202 rotates the respective camera directions to be consistent among all cameras.

To normalize camera views, in one example, the activity map generation circuit 202 chooses the i-th camera view as the default world view at angle ψ=0; that is, the i-th camera has directions with respect to its view of $\theta_q = \{q\pi/4, q=1, 2, \ldots, 7\}$. For another camera, if the world view is different (e.g., $\psi_q = q\pi/4, q \neq 0$), then the activity map generation circuit 202 rotates the quantized directions for this camera by the difference as shown below in Equation (31) to normalize the camera views. In Equation (31), $|*|_8$ denotes modulo-8 arithmetic.

$$\theta_q' = |\theta_q + \psi_q|_8 \quad (31)$$

Inter-Camera Density Feature Normalization

As mentioned above, the density and dwell activity maps are probability functions plotted on a spatial coordinate plane. The probabilities are initially determined with respect to samples (e.g., motion edge pixels) for a single camera.

At step S408, the activity map generation circuit 202 normalizes the density and/or dwell probabilities with respect to all cameras; that is, the probabilities are divided by the sum of the number of samples. However, for visualization of the heat maps, normalization may reduce information, in part due to the limited color quanta of display. For example, in the case of a wide discrepancy of activity between cameras, the lower activity camera may display zero or flat activity.

To effectively increase the dynamic range of display for the wide-area activity map, the activity map generation circuit 202 may annotate the activity map with a multiplier that indicates its relative amount of activity for a given region of the map. This is sometimes referred to herein as a normalization factor.

Two example options for density and dwell feature normalization are discussed herein. However, example embodiments should not be limited by these examples.

Option 1 entails normalizing the density or dwell functions for each camera by the sum of motion activity from all cameras n=0, ..., N−1, as shown below in Equation (32).

$$P'(x, y, t, n1) = \frac{P(x, y, t, n1)S_{n1}}{\sum_{n=0}^{N-1} S_n} \quad (32)$$

In Equation (32), n1 is an individual camera number, and P denotes either density probability $P_D$ or dwell probability $P_W$ from equations (6) and (8) respectively.

In option 2, the activity map generation circuit 202 simply displays the map with original $P_D$ or $P_W$ values, but with additional labels close to the map indicating the percentage portion of the wide-area density sum given by Equation (33) shown below. An example of this is shown in FIG. 10.

$$L_{n1} = \frac{S_{n1} \times 100}{\sum_{n=0}^{N-1} S_n} [\%] \quad (33)$$

Normalizing/Correcting Perspective Spread

When an object of interest, such as a standing person, is viewed by a tilted camera, the measured activity is spread beyond that person due to the camera perspective (e.g., as if a shadow were cast). This spread is asymmetric with respect to the person (in the direction away from the camera), and thus, the activity maps for the features also reflect this asymmetry.

At step S410, the activity map generation circuit 202 transforms the perspective spread of each activity map. In one example, the activity map generation circuit 202 corrects this asymmetry such that the activity maps are symmetric to both sides of the location of an object of interest, as if the camera was viewing vertically down (orthographically) toward the top of the object of interest (e.g., toward the head). An example of this perspective spread correction/normalization is shown in FIG. 8, which illustrates an example correction of a camera view.

Figure 8:
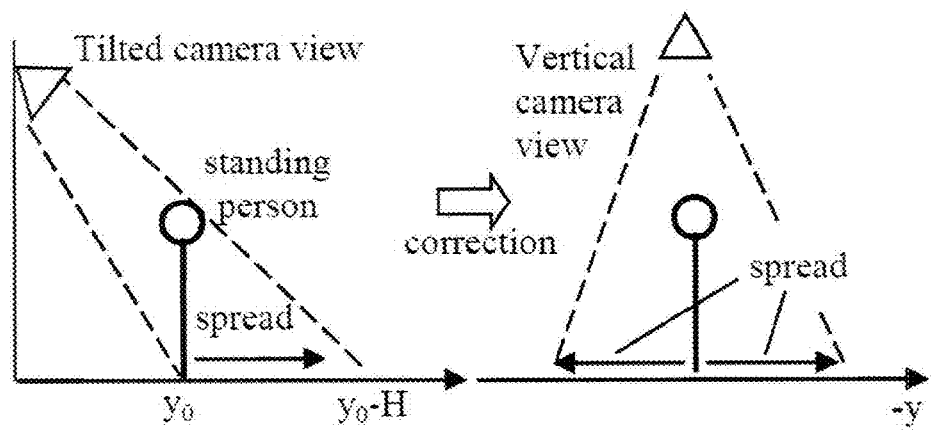
FIG. 8 illustrates an example correction of a camera view.

In the example shown in FIG. 8, the spread cannot be undone. The result of the correction is to increase the spread from length H to 2H. However, the correction does make the spread symmetric about the $y_0$ location such that when the density is viewed from the perspective of the vertical camera, the maximum density is at the $y_0$ location as is desired.

The activity map generation circuit 202 uses a filter to de-skew the spread to be symmetric both toward and away from the respective camera, so the symmetry is equal for transformation to the vertical view. The camera azimuth angle is assumed to be aligned to the direction of motion (e.g., hallway or road direction) such that horizontal of the camera view is parallel to the surface of the area being viewing, and the vertical tilt of the camera is theta (θ) from the horizontal view. In one example, the activity map generation circuit 202 utilizes a 1-dimensional raised ramp function, whose coefficients r(y) vary in the y dimension of the image as shown below in Equation (34).

$$r(y-i) = \{1 + id(y-i)\}, i = 0, 1, \ldots H(y)-1 \quad (34)$$

In Equation (34), the parameter H(y) is the average height of a person whose feet are at image coordinate y, and the slope coordinates of the function d(y−i) are related to H(y) as shown below in Equation (35).

$$d(y-i) = \frac{H(y)}{\sum_{i=0}^{H(y)-1}(2i^2 - iH(y))} \quad (35)$$

The activity map generation circuit 202 convolves the filter function with each pixel location (x,y) of each probability density function $P_D$ or $P_W$ (generalized as P here) as shown below in Equation (36).

$$P'(x,y,t) = \Sigma_{i=0}^{H(y)-1}(r(y-i)P(x,y-i),t) \quad (36)$$

Figure 9:
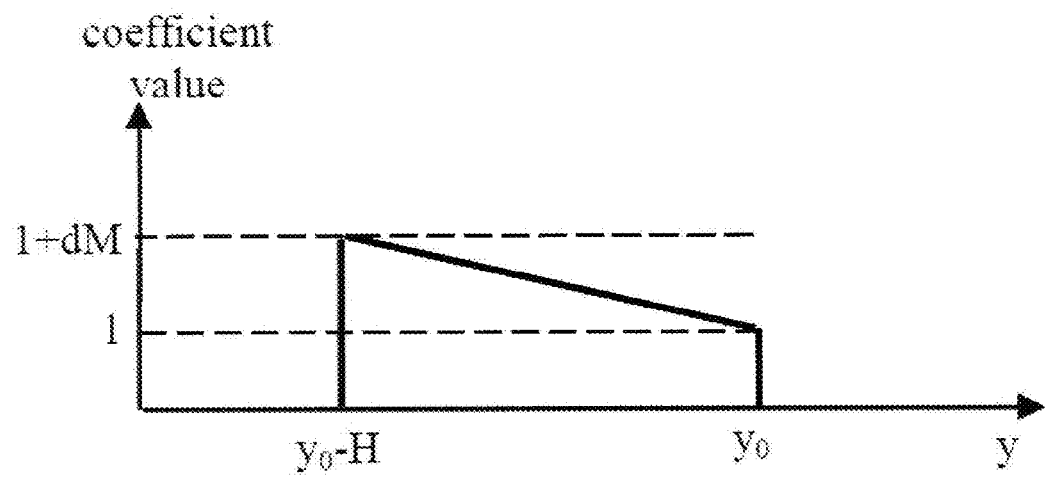
FIG. 9 illustrates an example spread correction filter.

FIG. 9 illustrates an example spread correction filter in which the filter spans in the negative y direction from $y_0$ to $y_0$-H. This is an example in which a filter is used to de-skew the spread to be symmetric both toward and away from the camera, so the symmetry is equal for transformation to the vertical view. In this case, the camera azimuth angle is assumed to be aligned to the direction of motion (e.g., hallway or road direction) such that horizontal of the camera view is parallel to the surface of the area being viewed, and the vertical.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. An apparatus for monitoring movement of objects of interest in an area, the apparatus comprising:
   an activity map generation circuit configured to,
      generate a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area, and
      standardize the plurality of activity maps with regard to a single common point of view;
   a unified spatial activity map generation circuit configured to combine the plurality of standardized activity maps into a unified activity map; and
   wherein the activity map generation circuit is further configured to standardize the plurality of activity maps with regard to the single common point of view by at least one of
      modifying a direction feature with respect to tilt of at least one camera among the plurality of cameras,
      transforming a spatial perspective of at least one of the plurality of activity maps from image coordinates to coordinates corresponding to the single common point of view,
      normalizing an orientation of at least one of the plurality of activity maps,
      normalizing probabilities with respect to at least one of the plurality of cameras, and
      transforming a perspective spread of at least one of the plurality of activity maps.

2. The apparatus of claim 1, further comprising:
   a display configured to display the unified activity map to a user.

3. The apparatus of claim 2, wherein the display is configured to display the unified activity map to the user along with a trajectory graph corresponding to the unified activity map.

4. The apparatus of claim 1, further comprising:
   a memory configured to store the unified activity map.

5. The apparatus of claim 1, wherein the activity map generation circuit is further configured to,
   generate a set of motion blur images for each of the plurality of cameras based on the video content, and
   generate each of the plurality of activity maps based on a corresponding set of motion blur images.

6. The apparatus of claim 5, wherein:
   the video content from each of the plurality of cameras includes a sequence of image frames; and
   the activity map generation circuit is configured to,
      generate each motion blur image in the set of motion blur images based on a motion blur image corresponding to a current image frame in the sequence of image frames and motion blur images corresponding to previous image frames in the sequence of image frames.

7. The apparatus of claim 1, wherein the relative activity of the objects of interest over time is one of density, dwell, direction, bi-direction and velocity of the objects of interest over time.

8. The apparatus of claim 1, wherein each of the plurality of activity maps includes spatial activity feature values for one of density, dwell, direction, bi-direction and velocity.

9. An apparatus for monitoring movement of objects of interest in an area, the apparatus comprising:
   an activity map generation circuit configured to
      generate, using a single motion blur method, a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area, and
standardize the plurality of activity maps with regard to a single common point of view;
a unified spatial activity map generation circuit configured to combine the plurality of standardized activity maps into a unified activity map; and
wherein the activity map generation circuit is further configured to standardize the plurality of activity maps with regard to the single common point of view by at least one of,
modifying a direction feature with respect to tilt of at least one camera among the plurality of cameras,
transforming a spatial perspective of at least one of the plurality of activity maps from image coordinates to coordinates corresponding to the single common point of view,
normalizing an orientation of at least one of the plurality of activity maps,
normalizing probabilities with respect to at least one of the plurality of cameras, and
transforming a perspective spread of at least one of the plurality of activity maps.

10. The apparatus of claim 9, wherein the unified activity map includes spatial and temporal activity feature values for the objects of interest.

11. The apparatus of claim 9, further comprising:
a display configured to display the unified activity map to a user.

12. The apparatus of claim 11, wherein the display is configured to display the unified activity map to the user along with a trajectory graph corresponding to the unified activity map.

13. The apparatus of claim 9, further comprising:
a memory configured to store the unified activity map.

14. The apparatus of claim 9, wherein the activity map generation circuit is further configured to,
generate a set of motion blur images for each of the plurality of cameras based on the video content, and
generate each of the plurality of activity maps based on a corresponding set of motion blur images.

15. The apparatus of claim 14, wherein:
the video content from each of the plurality of cameras includes a sequence of image frames; and
the activity map generation circuit is configured to,
generate each motion blur image in the set of motion blur images based on a motion blur image corresponding to a current image frame in the sequence of image frames and motion blur images corresponding to previous image frames in the sequence of image frames.

16. The apparatus of claim 9, wherein the relative activity of the objects of interest over time is one of density, dwell, direction, bi-direction and velocity of the objects of interest over time.

17. A method for monitoring movement of objects of interest in an area, the method comprising:
generating a plurality of activity maps based on video content from a plurality of cameras, each of the plurality of activity maps being indicative of relative activity of the objects of interest over time within a field of view of a camera among the plurality of cameras, and each of the plurality of cameras having a different corresponding field of view in the area;
standardizing the plurality of activity maps with regard to a single common point of view;
combining the plurality of standardized activity maps into a unified activity map;
at least one of storing and displaying the unified activity map; and
wherein the standardizing the plurality of activity maps with regard to a single common point of view includes at least one of
modifying a direction feature with respect to tilt of at least one camera among the plurality of cameras,
transforming a spatial perspective of at least one of the plurality of activity maps from image coordinates to coordinates corresponding to the single common point of view,
normalizing an orientation of at least one of the plurality of activity maps,
normalizing probabilities with respect to at least one of the plurality of cameras, and
transforming a perspective spread of at least one of the plurality of activity maps.

18. A non-transitory computer-readable medium storing computer-executable instructions that, when executed on a computer device, cause the computer device to execute the method of claim 17.

* * * * *